(12) United States Patent
Wallach

(10) Patent No.: US 6,755,484 B2
(45) Date of Patent: Jun. 29, 2004

(54) WHEEL CLIP

(76) Inventor: Mark K. Wallach, 101 Gedney, Nyack-on-the-Hudson, NY (US) 10960

( * ) Notice: Subject to any disclaimer, the term of this patent is extended or adjusted under 35 U.S.C. 154(b) by 0 days.

(21) Appl. No.: 10/228,007

(22) Filed: Aug. 26, 2002

(65) Prior Publication Data
US 2003/0047988 A1 Mar. 13, 2003

Related U.S. Application Data
(60) Provisional application No. 60/315,190, filed on Aug. 27, 2001.

(51) Int. Cl.[7] .............................. B60B 7/00; B60B 7/16; B60B 7/10
(52) U.S. Cl. .............................. 301/37.102; 301/37.31; 301/37.34; 301/37.21
(58) Field of Search .................. 301/37.11, 37.102, 301/37.31, 37.34, 37.371, 37.101, 37.21

(56) References Cited

U.S. PATENT DOCUMENTS

| | | | |
|---|---|---|---|
| 2,827,332 A | * 3/1958 | Chamberlin | 301/37.34 |
| 2,874,561 A | * 2/1959 | Alger | 301/37.21 |
| 2,947,575 A | 8/1960 | Lyon | |
| 3,724,905 A | 4/1973 | Kachler | |
| 4,725,100 A | * 2/1988 | Patti | 301/37.28 |
| 5,188,428 A | * 2/1993 | Carter, III | 301/37.11 |
| 5,366,278 A | * 11/1994 | Brumfield | 301/37.34 |
| 5,577,809 A | * 11/1996 | Chase | 301/37.43 |
| 5,770,797 A | 6/1998 | Lapohn | |
| 5,839,796 A | 11/1998 | Ichikawa et al. | |
| 5,873,637 A | * 2/1999 | Ichikawa | 301/37.34 |
| 5,884,981 A | * 3/1999 | Ichikawa | 301/37.34 |

* cited by examiner

Primary Examiner—S. Joseph Morano
Assistant Examiner—Jason R. Bellinger
(74) Attorney, Agent, or Firm—Rader, Fishman & Grauer PLLC

(57) ABSTRACT

A wheel rim assembly includes a wheel rim and a wheel cover. The wheel rim assembly also includes a clip assembly for attaching a wheel cover to a wheel rim. The clip assembly includes a bracket portion and a base portion. The bracket portion affixes to the wheel cover. The base portion is a planar strip that is curved to conform and affix to an inner periphery of the wheel rim.

15 Claims, 2 Drawing Sheets

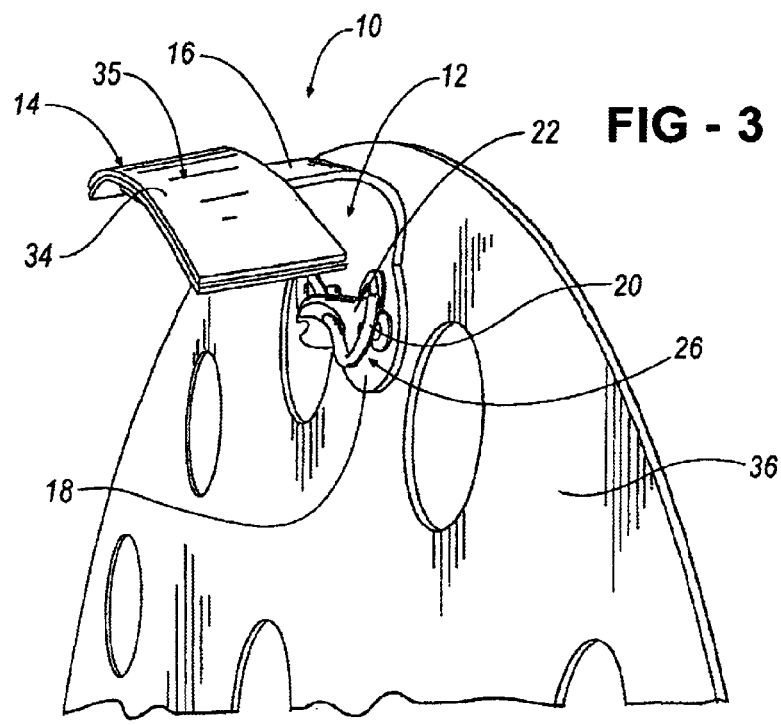
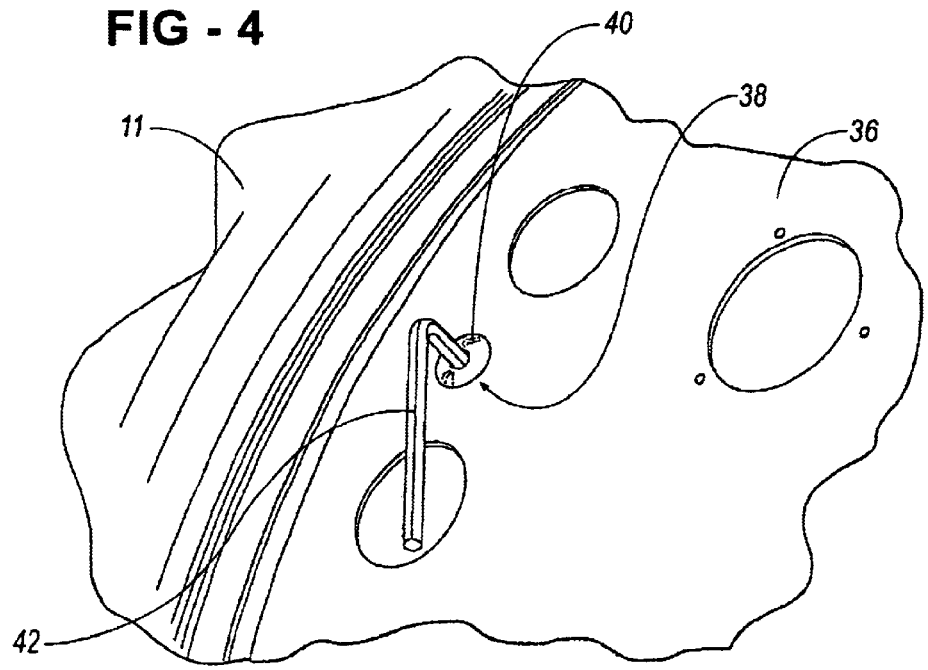

WHEEL CLIP

RELATED APPLICATIONS

This application claims priority to U.S. Provisional Application No. 60/315,190 filed Aug. 27, 2001.

TECHNICAL FIELD

The present invention relates to wheel rim arrangements. More specifically, the invention relates to a wheel clip that secures a wheel cover to a wheel rim.

BACKGROUND OF THE INVENTION

Wheel rim arrangements for vehicles may include a wheel cover. Therefore, there is a need in the art to attach a wheel cover to the wheel rim.

SUMMARY OF THE INVENTION

In a first embodiment of the invention, a wheel rim assembly including a wheel rim and a wheel cover is described. The wheel rim assembly comprises a clip assembly for attaching a wheel cover to a wheel rim. The clip assembly includes a bracket portion and a base portion. The bracket portion affixes to the wheel cover. The base portion is a planar strip that is curved to conform and affix to an inner periphery of the wheel rim.

A second embodiment of the invention is a wheel rim assembly. In this embodiment, the bracket portion comprises a first end and a second end. The second end comprises a spring clip and a Dzus fastener that allows attachment of the wheel clip assembly to the wheel cover. The spring clip is permanently affixed to the second end by protrusions that extend from the second end in opposing relationship about a passage that provides clearance for the Dzus fastener for engagement about the spring clip. The Dzus fastener is twisted and fastened about the spring clip in order to draw the wheel cover adjacent to the second end of the bracket portion. The base portion comprises an adhesive about an outer side for adhering the wheel clip assembly to the inner periphery of the wheel rim.

Another embodiment of the invention is a wheel rim assembly. In this embodiment, the wheel rim assembly comprises means for affixing a wheel cover to a wheel rim, means for affixing to a wheel cover, and means for affixing to a wheel rim.

Various additional aspects and advantages of this invention will become apparent to those skilled in the art from the following detailed description of the preferred embodiment, when read in light of the accompanying drawings.

BRIEF DESCRIPTION OF THE DRAWINGS

FIG. 3 is another perspective view of the wheel clip assembly fastened to the interior of a wheel cover;

FIG. 4 is a perspective view of the exterior of a wheel cover and a fastener.

DETAILED DESCRIPTION OF THE PREFERRED EMBODIMENTS

Figure 1:
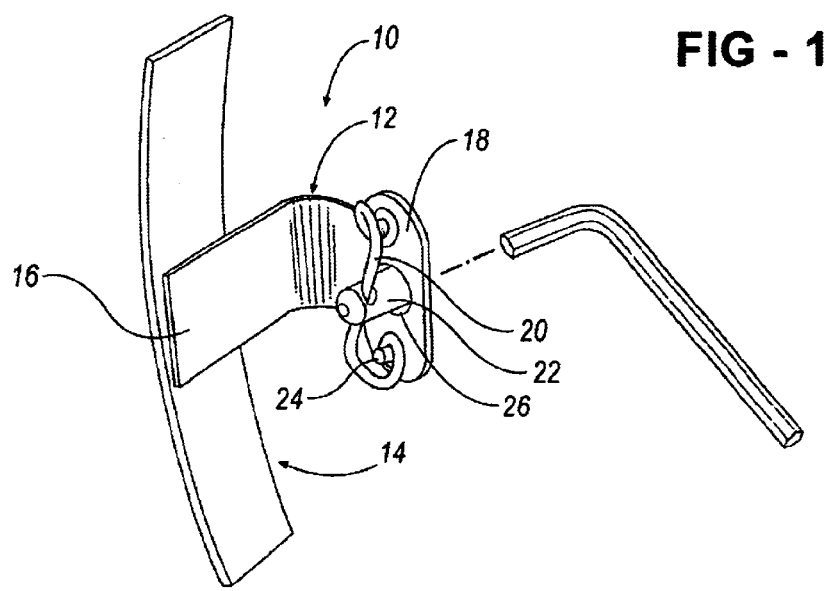
FIG. 1 is a perspective view of a wheel clip assembly.
Figure 2:
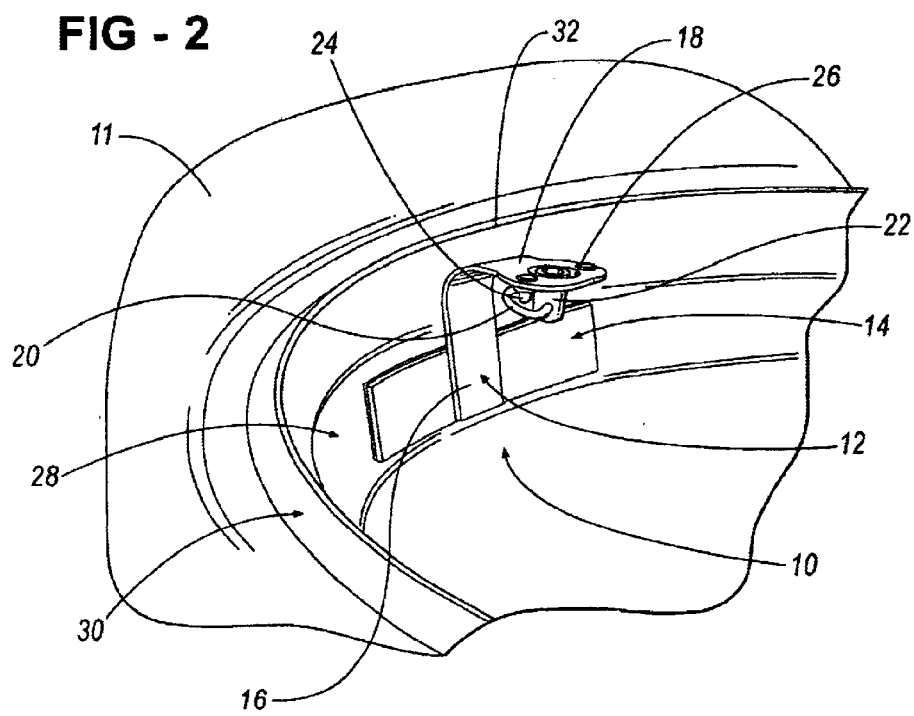
FIG. 2 is another perspective view of a wheel clip assembly affixed to an inner periphery of wheel rim.

As shown in FIG. 1, a wheel clip assembly, which is shown generally at 10 comprises means for affixing, such as a bracket portion 12, to a wheel cover 36 (FIGS. 3–4), and means for affixing, such as base portion 14, to a wheel rim 30 (FIG. 2). The bracket portion 12 includes a first end 16 and a second end 18. The base portion 14 is defined to be a planar strip that is curved to conform to the inner periphery 28 of the wheel rim 30.

The bracket portion 12 and base portion 14 may be manufactured with a single, rigid material, such as, for example, stainless steel or any suitable plastic or metal. Alternatively, if desired, the bracket portion 12 may be manufactured from a first rigid material, such as, for example, metal, and the base portion 14 may be manufactured from a second rigid material, such as, for example, plastic. If the bracket portion 12 and the base portion 14 are manufactured from two different materials, the first end 16 of the bracket portion 12 is adjacently coupled to the base portion 14 by either a conventional adhesive, welding, bolting, or any other desirable fastening technique.

The second end 18 of the bracket portion 12 provides fastening means, such as, for example, a spring clip 20 and a fastening stud 22 that allows attachment of the wheel clip assembly 10 to the wheel cover 36. Although illustrated in FIGS. 3 and 4 as a flat disc, the wheel cover 36 may be an aerodynamic wheel cover in the shape of a dome with a single passage defined by a narrow diameter about its apex. The aerodynamic wheel cover is described in non-provisional U.S. Patent Application Ser. No. 10/228,027, filed on Aug. 26, 2002 and provisional U.S. Patent Application Ser. No. 60/315,205 filed on Aug. 27, 2001, which are incorporated herein by reference. The aerodynamic wheel cover is under assignment to inventor of the present patent application and is commercially available from the Aero-Chex Corporation of Nyack-on-the-Hudson, N.Y.

The spring clip 20 may be permanently affixed to the second end 18 of the bracket portion 12. The fastening means may further comprise protrusions 24 that extend from second end 18 in opposing relationship about a passage 26 that provides clearance for the fastening stud 22 for engagement about the spring clip 20. As illustrated, the fastening stud 22 may be inserted through the passage 26, twisted about the passage 26, and locked about the spring clip 20.

The fastening stud 22 may be any desirable fastener, such as, for example, a fastener sold under the tradename DZUS®, and is commercially available from McKechnie Specialist Products Limited Company, United Kingdom. The DZUS® fastener 22 may be twisted at a key portion 40 (FIG. 4) through the use of an Allen Wrench 42 (FIG. 4) so that it may be locked on the spring clip 20. The spring clip 20 draws the DZUS® fastener 22 away from the second end 18 when the Allen Wrench 42 is turned and creates a sufficient pressure where the diameter of the key portion 40 meets the wheel cover 36.

As seen in FIG. 2, the wheel clip assembly 10 is first located at an inner periphery 28 of a wheel rim 30. This principle combination provides circumferential support of the wheel clip assembly 10 to the wheel rim 30. The base portion 14 is desirably positioned within the inner periphery 28 of the wheel rim 30 so that the second end 18 may be on the same plane of an outer circumference 32 of the wheel rim 30. As illustrated in FIG. 3, the wheel clip assembly 10 adheres to the inner periphery 28 of the wheel rim 30 by use of the adhesive 34 about an outer side 35 of the base portion 14.

The adhesive 34 may be a doubled-sided tape, glue, or any substance that may withstand the intense heat generated by a vehicle braking system and tire 11. The adhesive 34 may be preferably selected to have properties that will increases its adhesivness over time when intense heat is exhibited on the wheel rim 30. As the vehicle is moving, centrifugal forces acting on the wheel clip assembly 10 also increases the adhesivness of the adhesive 34 which supplements the integrity of the circumferential support of the wheel clip assembly 10 to the wheel rim 30. The use of adhesive 34 on the base portion 14 gives the flexibility of attaching the wheel clip assembly 10 to a variety of wheel rims having different diameters. Alternatively, wheel clip assembly 10 may adhere to the inner periphery 28 of the wheel rim 30 by directly welding, bolting, or with an other desirable manufacturing technique.

Accordingly, when the wheel clip assembly 10 is adhered to the inner periphery 28 of the wheel rim 30, the wheel clip assembly 10 is then desirably fastened to the interior of a wheel cover 36. As illustrated in FIGS. 3 and 4, the second end 18 of the bracket portion 12 provides fastening means to the wheel cover 36 by extending the DZUS® fastener 22 through an opening 38 (FIG. 4) in the wheel cover 36 and the passage 26 (FIG. 3) of the second end 18.

Referring specifically to FIG. 4, the DZUS® fastener has a key portion 40 with a larger diameter than the opening 38 so that proper attachment of the wheel cover 36 to the clip assembly 10 may be executed. Even further, if the aerodynamic wheel cover is used, the key portion 40 with the larger diameter provides sufficient sealing of the opening 38 such that a low pressure may by maintained in the wheel cover such that it may maintain a vacuum to expedite warm air from the wheel rim 30 at the single narrow passage about its apex.

Accordingly, once the DZUS® fastener 22 is received at the second end 18 and is positioned about spring clip 20, the Allen Wrench 42 is inserted into the key portion 40 of the DZUS® fastener 22 and is twisted so that proper locking of the wheel cover 36 to the clip assembly 10 occurs. Sufficient pressure exerted by the DZUS® fastener 22 draws the wheel cover 36 adjacent to second end 18 of the bracket portion 12.

Thus, the wheel clip assembly 10 provides an intermediate, lateral attachment of the wheel cover 36 to the wheel rim 30. Examples of possible vehicle applications of the wheel clip assembly 10 may be Class 8 Tractors, Class 8 Trailers, Class 7/6 Tractors, Class 5/4/3 Trucks, Class 2C Trucks, School Buses, or even Greyhound-type Buses.

While the invention has been specifically described in connection with certain specific embodiments thereof, it is to be understood that this is by way of illustration and not of limitation, and the scope of the appended claims should be construed as broadly as the prior art will permit.

What is claimed is:

1. A wheel rim assembly including a wheel cover and a wheel rim, comprising:
a clip assembly for attaching a wheel cover to a wheel rim, wherein the clip assembly includes:
a bracket portion that affixes to the wheel cover, wherein the bracket portion further comprises a first end and a second end, wherein the second end further comprises a spring clip and a fastening stud that allows attachment of the wheel clip assembly to the wheel cover, wherein the spring clip is permanently affixed to the second end by protrusions that extend from the second end in opposing relationship about a passage that provides clearance for the fastening stud for engagement about the spring clip, and
a base portion that affixes to the wheel rim, wherein the base portion is a planar strip that is curved to conform to an inner periphery of the wheel rim.

2. The wheel rim assembly of claim 1, wherein the fastening stud is a fastener that may be twisted and fastened about the spring clip in order to draw the wheel cover adjacent to second end of the bracket portion.

3. The wheel rim assembly of claim 1, wherein the base portion comprises an adhesive about an outer side for adhering the wheel clip assembly to the inner periphery of the wheel rim.

4. The wheel rim assembly of claim 1, wherein the bracket portion and the base portion comprise a rigid material.

5. The wheel rim assembly of claim 4, wherein the rigid material is stainless steel.

6. The wheel rim assembly of claim 1, wherein the bracket portion comprises a first rigid material and the base portion comprises a second rigid material.

7. The wheel rim assembly of claim 6, wherein the first rigid material is stainless steel and the second rigid material is plastic.

8. A wheel rim assembly including a wheel cover and a wheel rim, comprising:
a clip assembly for attaching a wheel cover to a wheel rim, wherein the clip assembly includes:
a bracket portion that affixes to the wheel cover, wherein the bracket portion further comprises a first end and a second end, wherein the second end further comprises a spring clip and a fastener that allows attachment of the wheel clip assembly to the wheel cover, wherein the spring clip is permanently affixed to the second end by protrusions that extend from the second end in opposing relationship about a passage that provides clearance for the fastener for engagement about the spring clip, wherein the fastener is twisted and fastened about the spring clip in order to draw the wheel cover adjacent to second end of the bracket portion, and
a base portion that affixes to the wheel rim, wherein the base portion is a planar strip that is curved to conform to an inner periphery of the wheel rim, wherein the base portion comprises an adhesive about an outer side for adhering the wheel clip assembly to the inner periphery of the wheel rim.

9. The wheel rim assembly of claim 8, wherein the bracket portion and the base portion comprise a rigid material.

10. The wheel rim assembly of claim 9, wherein the rigid material is stainless steel.

11. The wheel rim assembly of claim 8, wherein the bracket portion comprises a first rigid material and the base portion comprises a second rigid material.

12. The wheel rim assembly of claim 11, wherein the first rigid material is stainless steel and the second rigid material is plastic.

13. A wheel rim assembly including a wheel cover and a wheel rim, comprising:
means for affixing a wheel cover to a wheel rim;
a bracket portion comprising a first end and a second end, wherein the second end further comprises a spring clip and a fastener that allows attachment of the wheel clip assembly to the wheel cover, wherein the spring clip is permanently affixed to the second end by protrusions that extend from the second end in opposing relationship about a passage that provides clearance for the fastener for engagement about the spring clip, wherein the fastener is twisted and fastened about the spring clip in order to draw the wheel cover adjacent to second end of the bracket portion; and
a base portion that affixes to a wheel rim.

14. The wheel rim assembly of claim 13, wherein the means for affixing a wheel cover to a wheel rim is a wheel clip assembly.

15. The wheel rim assembly of claim 13, wherein the base portion is a planar strip that is curved to conform to an inner periphery of the wheel rim, wherein the base portion comprises an adhesive about an outer side for adhering the wheel clip assembly to the inner periphery of the wheel rim.

* * * * *